United States Patent Office 3,849,551
Patented Nov. 19, 1974

3,849,551
BCG AS ADJUVANT IN MALARIA VACCINATION
Lawrence E. D'Antonio, 1000 Clifton Ave.,
Collingdale, Pa. 19023
No Drawing. Filed Sept. 28, 1972, Ser. No. 292,945
Int. Cl. C12k 5/00
U.S. Cl. 424—88                                      15 Claims

ABSTRACT OF THE DISCLOSURE

A malaria vaccine preparation is disclosed in which *Mycobacteria bovis*, strain Calmette - Guerin bacillus (BCG) is employed as an adjuvant in conjunction with non-living vaccine materials. The BCG vaccine provides a potent yet safe stimulus for vaccination against malaria when used in conjunction with a plasmodial vaccine such as a *Plasmodium knowlesi* partially purified plasmodial vaccine fraction.

BACKGROUND AND SUMMARY OF THE INVENTION

The present invention is related to the use of BCG as an adjuvant in malaria vaccination. More particularly, the present invention is related to the use of *Mycobacteria bovis*, strain Calmette-Guerin bacillus (BCG), as an adjuvant in conjunction with a non-living malaria vaccine preparation.

BCG is a living attenuated mycobacteria widely used for vaccination against human tuberculosis. It has been employed as an adjuvant in guinea pigs in conjunction with living cancer cells to induce specific immunity against such cells (see Zbar et al., Science, 170:1217 (1970)). It has also been used to induce an immunological response against intradermal metastatic tumors by direct injection into the tumors (see Morton et al., Surgery, 68:158 (1970)).

By the present invention there is provided a malaria vaccine preparation in which BCG is employed as an adjuvant in conjunction with non-living vaccine materials. The BCG vaccine provides a potent yet safe stimulus for vaccination against malaria when used in conjunction with the appropriate plasmodial vaccine. In the immunization against malaria, the BCG may be administered by any of several methods including the subcutaneous, intradermal, intramuscular, intranodal (lymph node), oral, intranasal (aerosol) or intravenous route. The vaccine material may be administered by the same method as the BCG except for the oral route, or by a separate route.

The prime purpose for the use of adjuvants in immunization procedures is to convert an otherwise absent or weak immunological response to the vaccine material to a highly potent one while at the same time producing an accelerated effective protective response with a minimum of vaccine material and injections. BCG vaccination may be used to safely produce a powerful stimulus for effective vaccination against malaria when administered in conjunction with non-living malaria vaccine material.

THE BCG VACCINE

The BCG vaccine which is employed in the present invention may be any of the stably attenuated strains of the vaccine. It is essential that a relatively large number of the BCG bacilli still be alive in the vaccine at the time of utilization. A particular strain of BCG which has been used with good results is the Tice strain, obtained from the Research Foundation at the University of Illinois. This strain of BCG appears to be especially potent and consistent for the purposes of the present invention. The preparation of the BCG vaccine is well known in the art and is described, for example, in Rosenthal et al., Stabilization and Standardization of BCG Vaccine, ACTA Scand., 42:159. One form of the vaccine which is often used is a freeze dried preparation containing $10^8$ viable organisms per ml. (15 mg. viable moist equivalent weight). The sealed preparation should be stored at 4° C. and may be suitably reconstituted by the addition of 1 ml. of distilled water shortly before use.

While the manner of BCG administration in the primate study discussed hereinafter is well suited for these animals and is quite valuable in establishing the adjuvant properties of BCG in conjunction with a non-living malaria vaccine, such methods of administration are not well suited for humans. If BCG is to be practically and safely employed as an adjuvant in conjunction with vaccine materials for use in humans it should be administered for this purpose in the same manner that it would be administered when generally used as an anti-tuberculosis vaccine. When administered to humans in the prescribed manner it is known to be safe and has been employed without serious incident over the past 40 years in over 200 million persons throughout the world. A description of the BCG vaccination procedures for humans is discussed in detail in R. Mande, BCG Vaccination, Dawsons of Pall Mall, London, 1968. As described in this publication, BCG can be administered either parenterally or orally. The parenteral method of administration may be accomplished by either the multiple puncture method, the scarification method or the intradermal method. In the multiple puncture method, a number of skin punctures (15 or more) are made through the BCG vaccine containing in one laboratory procedure, for instance, 20 mg. of fresh BCG per ml. In a variation of this method, multiple punctures are made with a metal disc apparatus. The puncture points of the disc are precoated by dipping in a suspension containing $2 \times 10^8$ viable BCG organisms per 0.5 ml. The suspension is then freeze dried on the disc points and the disc stored in the cold until used.

In the scarification method, cuts of the appropriate length are made with a vaccinal lancet or a solid needle through drops of BCG liquid previously placed on the skin. The BCG for scarification is the same as the highly concentrated form used with the multiple puncture method and varies according to the laboratory producing the vaccine.

The intradermal method, which is the preferred method, may be carried out by injecting intradermally 0.1 ml. of vaccine preparation containing 0.5, 0.75, or 1 mg. of liquid BCG per ml. Injection can be carried out with a 1 ml. syringe graduated in 0.01 ml. and fitted with an intradermic needle with a short bevel and a sharp point. The size of the wheal produced should be carefully controlled. An automatic apparatus known as Dermo-Spray may also be employed, this apparatus contains a transparent reservoir and a mechanical device which takes off 0.1 ml. of the liquid and thrusts it out through a capillary orifice under high pressure. The very thin stream pierces the skin, immediately producing a white papule.

Vaccination with BCG by the intradermal route is preferably carried out on the postero-external side of the arm where the upper and middle third meet, i.e., at the insertion of the deltoid muscle or slightly below and behind it. Intradermal BCG vaccination has been carried out using a total of 0.012 to 0.038 mg. of vaccine per injection (see Rosenthal, "BCG Vaccination Against Tuberculosis in Chicago, a Twenty-Year Study Statistically Analyzed," Pediatrics, October 1961, 622).

In carrying out the oral method of BCG vaccination, the so-called Brazilian method is preferred. This route when used should probably be reserved for very young children. As one example, new borns may be given 2 doses of 50 mg. of freeze dried BCG on the 4th and 8th day after birth. The actual dose should be proportionate to the quality of the vaccine strain used.

THE MALARIA VACCINE

In the preparation of a partially purified vaccine fraction, isolation of the blood stage malaria vaccine antigens to be used as vaccine material or as the basis for obtaining more highly purified or totally purified vaccine antigens may be carried out by any of several methods such as the following:

Blood infected with the desired specie of malaria is collected in an anticoagulant solution such as heparin or Alsevers solution. The red cells are separated from the plasma by centrifugation in the cold (4° C.) at 3500 g. for at least 5 minutes. The plasma and buffy coat is removed by aspiration and the cells are resuspended in a diluent such as isotonic (0.15 M) sodium chloride or phosphate buffered saline (isotonic and pH 7.0) and recentrifuged. Three additional washings are employed with the aspiration of any remaining buffy coat each time to assure removal of the blood white cells.

The washed cells are resuspended in a volume of diluent sufficient to give a 20% suspension and then placed in a cooled (4° C.) French Pressure Cell. The suspended blood is slowly passed through the needle valve of the French Pressure Cell. The pressure to be used for this step will depend on the predetermined optimum pressures for the particular specie of malaria, host red cell, and stage of the parasite. The desired pressure may lie anywhere between 800 p.s.i., more or less, to 2500 p.s.i., more or less. The first 2–3 ml. of effluent are discarded to avoid contamination with the few unruptured erythrocytes which may initially pass through the needle valve.

The above procedure selectively disintegrates the host red cells while largely preserving the mechanically less fragile malaria parasite. While nearly all of the red cells both infected and non-infected present in the malarious blood are finely disintegrated, a large number of free intact parasites and large parasite fragments remain. Any intact red cells escaping disintegration may be separated from the French Pressure Cell effluent by centrifugation at between 50 g. and 1100 g. maximum for 10 minutes.

The supernatant will contain the free parasites, large parasite fragments and a mixture of disintegrated erythrocytes and whatever parasites happened to be disintegrated. The free parasites and large parasite fragments are readily separated from the disintegrated materials by centrifugation at from 7000 g. to 12,000 g. maximum for up to 30 minutes (4° C.).

In Table I there is shown a diagram depicting the procedure for the French Pressure Cell (FPC) isolation of plasmodial materials and the preparation of a partially purified plasmodial vaccine fraction. Low pressure refers to FPC pressures between 800 and 2500 p.s.i.; high pressures refer to FPC pressures between 3000 and 40,000 p.s.i. Low gravity refers to centrifugation forces between 50 and 1100 g. maximum; high gravity refers to centrifugation forces between 7000 and 12,000 g. maximum.

The parasite sediment resulting from the above centrifugation contains the free parasites and larger parasite fragments and is almost completely free of the original host red cell stroma. The sediment A is washed three times by resuspension and centrifugation (7000 g. to 12,000 g. maximum), and finally resuspended in a volume of diluent estimated to give the final desired concentration of parasite vaccine fraction. A volume of diluent 7 to 10 times the volume of parasite sediment will generally result in a final vaccine fraction near that needed for vaccination procedures.

TABLE I

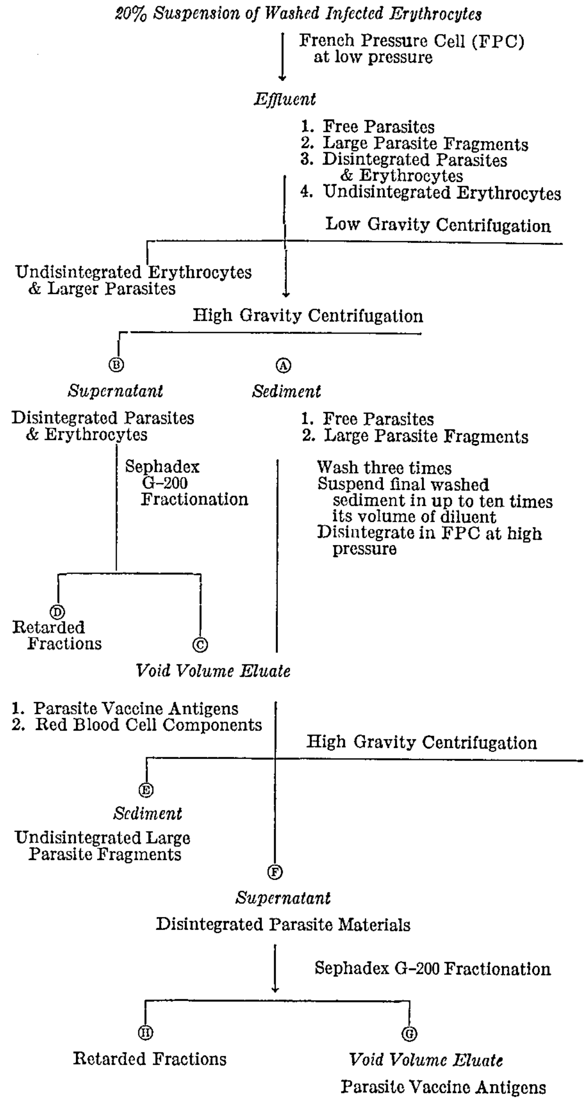

Notes:

| | |
|---|---|
| A = | The FPC isolated free parasites and associated large parasite fragments. |
| E = | The large parasite fragments remaining after high-pressure disintegration of isolated parasite Material A. |
| G = | The Sephadex G-200 void volume eluate of disintegrated parasite material A. |
| C = | The Sephadex G-200 void volume eluate of the mixture (B) containing disintegrated erythrocytes and parasites. |
| D and H = | The Sephadex G-200 retarded fractions for (B) and (F) respectively. |

The resuspended washed parasite material is passed through the French Pressure Cell at pressures anywhere from 3000 p.s.i. to 40,000 p.s.i. Following the high pressure passage, i.e., 3000 to 40,000 p.s.i., the effluent is centrifuged at 12,000 g. maximum for 30 minutes at 4° C. to remove any undisintegrated parasite material *E*. The resulting supernatant F contains the disintegrated parasite components not sedimenting at the above gravity force and time. The supernatent *F* contains the parasite vaccine antigens along with a relatively large amount of parasite iron containing pigment (hemazoin) and other parasite components.

Further isolation of the parasite vaccine antigens is accomplished by chromatographying supernatant *F* through a Sephadex G–200 column at 4° C. with one of the diluents as eluant. (Sephadex is produced by Pharmacia Fine Chemicals, Inc., Piscataway, N.J.). The Sephadex G–200 chromatography removes any remaining red cell stromal contaminants and further isolates the vaccine antigens from other parasite components. Other molecular sieve materials such as the Sepharose gels and Bio-gels may be used in place of Sephadex. In any case the material appearing in the void volume eluate contains the partially purified malaria vaccine antigens. The partially purified vaccine fraction G has been found to be serologically free of host stromal contamination and may be used as a specific complement fixing antigen in the serologic detection and diagnosis of malaria. Fraction G contains a relatively large amount of hemazoin which though it does not interfere with the fractions vaccine or serologic properties must be taken into account when attempting to relate the fraction's protein content to its vaccine concentration.

Additional purification and isolation of the malaria vaccine antigens may be obtained by removal of the relatively large quantity of hemazoin present in preparation G. The finely disintegrated hemazoin particles present in G may be readily aggregated and precipitated by taking advantage of the surface charge and large overall surface area they present. One method for accomplishing this is to remove the electrolytes present in *G* by such techniques as dialysis against distilled water or passage through appropriate gels such as the Sephadex, Sepharose, or Bio-gels mentioned above using distilled water as the eluant. Another procedure is to prepare *G* starting with product *A* with distilled water in place of the other diluants. The electrolyte free partially purified malaria vaccine fraction *G* is then placed in a sealed container with an inlet valve and exposed to 10–15 p.s.i. of carbon dioxide gas for 10 to 15 minutes. As the pH of the sample approaches 5.0 to 4.7, the hemazoin aggregates. The aggregated hemazoin is then centrifuged free of the vaccine fraction by removal from the container and centrifuging at approximately 5000 g. maximum for a number of minutes. The resulting faintly white turbid supernatant is then brought to the desired electrolyte concentration and pH by the addition of the proper salts and buffers. The OD* of the hemazoin free vaccine fraction at 2800 A. will be approximately ⅓ or less than that of the original hemazoin containing material. If the original OD were 5.0 for example, the new OD would be approximately 1.6 or less. In any event the amount of the hemazoin free preparation used for vaccination procedures should be such as to contain the equivalent vaccine antigens present in *G* at 5 OD units.

An alternative to the carbon dioxide method for removal of hemazoin from *G* would be to slowly add a weak acid solution to an electrolyte free sample of *G* while rapidly stirring. When the pH approaches 5.0–4.7 the hemazoin will aggregate and may be removed as above. In any event return of the hemazoin free sample to at least pH 7.0 should be made as soon as possible to avoid any adverse effects which prolonged standing at the lower pH may have on the vaccine antigens.

Additional isolation and purification of the malaria vaccine antigens may be made by any combination of a number of biochemical procedures. These might include ion-exchange or adsorption chromatography, sucrose gradient centrifugation, electrophoresis, salting out and selective precipitation procedures, phase separation, immunoadsorption, etc. Methods for selectively removing the red cell membranes from malaria infected blood may be carried out by any means which can take advantage of the greater mechanical fragility of the red cell over that of the parasite. Some of these methods other than the French Pressure Cell technique described above might include the nitrogen caviation method used in the Paar bomb, the Riby or Hughes press, etc.

The malaria vaccines to be employed for vaccination purposes may be used individually for each specie of malaria to be protected against or in combination as polyvalent vaccines. In addition vaccines which may eventually be made from the Sporozoite (mosquito phase) of the parasite may be incorporated so as to take advantage of the BCG adjuvant procedure. Such a "multi-malaria vaccine" used in conjunction with BCG as adjuvant would result in protective vaccination against the various sporozoite as well as blood stage infections.

*Optical density.

Finally, blood stage malaria vaccine materials should be made up of a combination of vaccines made from different lots of parasites of the same specie in order to insure protection against heterologous strain variants should they exist.

Crude malaria vaccine materials such as represented by products, *A, B, C, E,* or *F* in Table I could theoretically also be used for vaccination purposes. Even cruder preparations made by altering or killing the parasite in infected blood by various chemical or physical methods (i.e., formalin, heat, X-irradiation, etc.) could likewise theoretically serve as vaccine materials.

The use of such crude materials carry with them the hazard of sensitization against the red cell components still present. The only manner in which this might be avoided would be to use parasite preparations made from autologously infected blood. In addition, however, the presence of large amounts of antigenic material not related to the malaria vaccine antigens themselves could very well reduce the efficiency of the malaria vaccination.

The partially purified malaria vaccine material described in this report avoids the above difficulties. In addition the partially purified vaccine represented by *G* allows further biochemical separations. The more highly or completely separated vaccine antigens could be used to finally characterize and determine the structure of the various antigens. Such knowledge could eventually lead to increase in the immunogenic properties of the antigens by biochemical manipulations such as coupling to powerful antigen carriers. Eventually synthesis of the antigenic determinants may be accomplished allowing for the production of a semi-synthetic vaccine such as would be obtained by coupling the synthesized portion to an antigen carrier.

MALARIA VACCINATION PROTOCOLS

In order to take optimum advantage of the adjuvant effects induced by BCG, the timing and method of administration of the vaccine material in conjunction with the BCG vaccination itself is important. Preferably, the vaccine material being sensitized against should be administered so as to make contact with the elements of the reticuloendothelial system while they are under maximum stimulation by the BCG. Initial administration of the living BCG stimulates cells of the immune system which become involved in the area of immediate BCG contact. As the BCG organisms are carried from the immediate area and as they proceed to multiply, the regional lymphatics draining the area and finally the systemic elements of the reticuloendothelial system are stimulated. It is when these various areas are maximally stimulated that sensitization to the vaccine material is greatest.

On the parenteral administration of BCG as adjuvant in malaria vaccination, the BCG and malaria vaccine material should be introduced together. This can be accomplished by adding the malaria vaccine containing liquid to the BCG so that the combined vaccines will contain the requisite amount of BCG necessary for the particular method employed. Freeze dried BCG can be reconstituted with malaria vaccine containing liquid or the malaria vaccine liquid can be mixed with fresh BCG. The concentration and amount of malaria vaccine liquid used in combination with the BCG should be such as to arrive at a concentration of malaria vaccine material in the final mixture which would be equivalent to that necessary to give an optical density (OD) value of 3 to 5 at wavelength 2800 angstroms as measured on a spectrophotometer such as a Beckman model DU spectrophotometer.

The combined properly titrated vaccines may then be administered by the intradermal, scarification or multiple puncture method with the intradermal method being preferred. In the case of using the multiple puncture apparatus including a metal disk, as previously discussed, with freeze dried BCG already on the points, the instrument can be pressed through malaria vaccine already added at the puncture site. An alternative would be to freeze dry the combined malaria vaccine and BCG as described above onto the points together. It cannot be certain from present knowledge whether the malaria vaccine would remain active under these conditions.

Concomitant administration of the malaria vaccine and BCG as described above would assure initial local exposure of the malaria vaccine to immunological elements stimulated at the parenteral site. While such initial exposure might be sufficient to result in a final systemic vaccination against the malaria, it is felt that the additional steps suggested below will present optimal conditions for effective protective vaccination.

At the time of the initial administration of the combined vaccines outlined above, an injection (subcutaneous or intramuscular) of 1 ml. of malaria vaccine (5 OD units absorbance at 2800 A.) is administered a short distance from the initial site. This procedure should assure adequate exposure of the malaria vaccine antigens to the same lymphatic region draining and being gradually stimulated by the BCG organisms.

A similar second and third injection of malaria vaccine 3 and 12 weeks after the initial vaccination will further increase the systemic exposure to the vaccine. An alternative route of injection at such intervals would be the intravenous method. This route has the advantage of introducing vaccine antigens directly to the spleen while under BCG stimulation. Since this organ plays a prime role in the immunological defense against malaria, the greater its sensitization to the malaria vaccine antigens the more intense will be its activity in eradicating the disease should it be acquired.

The above effects may be attained by substituting a single injection of malaria vaccine in repository form. This would eliminate the need for follow up injections. Repository vaccine in the form of an alum precipitate or emulsion in acceptable oils would be injected intramuscularly as above at the time of BCG-malaria vaccine administration.

In the oral administration of BCG as adjuvant in malaria vaccination, one ml. of malaria vaccine is injected subcutaneously or intramuscularly initially and with each subsequent oral administration of BCG. A final 1 ml. of malaria vaccine may be injected twelve weeks after the initial vaccination to assure systemic and especially splenic exposure to the vaccine antigens during the period of BCG stimulation. As suggested above intravenous injection of the malaria vaccine after the initial vaccination would serve to heighten systemic exposure and hence sensitization.

The malaria vaccine material used in the above vaccination procedures refers to a partially purified malaria vaccine. As previously mentioned, the concentration of the vaccine material when used for malaria vaccination should be such as to provide an OD absorbance equivalent to approximately 5 units at a wave-length of 2800 angstroms.

The following examples are indicative of immunization procedures which have been carried out with primates, employing BCG as an adjuvant in conjunction with a nonliving malaria vaccine material, in accordance with the present invention:

EXAMPLE 1

In recent tests it has been shown that Rhesus monkeys could be successfully vaccinated against *Plasmodium knowlesi* malaria with *P. knowlesi* PPF (partially purified plasmodial vaccine fraction) in conjunction with Freund's Complete Adjuvant. Monkeys injected with antigen alone or in conjunction with alum or alginate adjuvants failed to demonstrate protection against *P. knowlesi* infection. Thus, when a small number of young Rhesus monkeys were injected intraperitoneally with either BCG vaccine or poly A-U alone or with one in combination with *P. knowlesi* vaccine fraction, it was found that monkeys receiving either BCG vaccine or Poly A-U alone were not protected against the subsequent *P. knowlesi* challenge. The monkey receiving Poly A-U in combination with *P. knowlesi* PPF was likewise not protected. The monkey receiving BCG vaccine in combination with the *P. knowlesi* PPF survived infection with *P. knowlesi* following a rather severe bout with the disease.

EXAMPLE 2

In the experiment of example one, which was designed to test the adjuvant properties of Calmette-Guerin bacillus (BCG) a juvenile Rhesus monkey was simultaneously injected intraperitoneally (IP) with 1.0 ml. of *P. knowlesi* vaccine and $10^7$ viable BCG organisms. The treatment was repeated three weeks later. The monkey, in addition, received 2.0 ml. of *P. knowlesi* vaccine alone IP at one and two weeks after the initial treatment and 1.0 ml. at four weeks after the initial treatment. A second juvenile Rhesus monkey acted as a BCG control. It received $10^7$ BCG viable organisms IP initially and three weeks later. All animals were eventually challenged IV with *P. knowlesi* infective cells. At the time of challenge at least one untreated control monkey received the same number of infective cells from the same infective pool.

In this example, Rhesus monkeys chronically infected with *P. knowlesi* served as the source of infective material. The partially purified *P. knowlesi* vaccine fraction was prepared by the French pressure cell technique and stored at $-70°$ C. or in liquid nitrogen.

The basic vaccination treatments for each of 10 mature Rhesus monkeys consisted of an initial intramuscular (IM) injection of 1.0 ml. (Group I) or 2.0 ml. (Groups II and III) of the malaria vaccine emulsified in an equal volume of FCA (Freund's complete adjuvant). Two similar treatments wth vaccine in Freund's incomplete adjuvant were given at approximately 1½ and 3 months. In Group I, two monkeys were treated as indicated above. In Group II, two monkeys were treated as above and, in addition, these monkeys received 0.2 ml. of malaria vaccine alone either intramuscularly or intravenously on the average of 5 times a week for 15 weeks. In Group III, 6 monkeys at the time of their basic treatment received, in addition, 1.0 ml. of malaria vaccine alone at a separate intramuscular site and a 1.0 ml. injection intravenously.

Eight of the 10 Rhesus monkeys in Groups I, II and III (see Table II) were challenged with between $10^3$ to $22 \times 10^3$ infective cells. One monkey from Group III and one from group II were challenged with $44 \times 10^3$ infective cells. The BCG treated animals were challenged with $10 \times 10^3$ infective cells.

Nine of the monkeys in Groups I, II, and III were challenged within 6 months of their last treatment. One monkey (Group III) which had failed to become infected, as had an untreated control monkey, following subcutaneous inoculation of 600 infective cells at 9 months was then chalenged IV over one year from its last treatment. The BCG treated monkeys were challenged six weeks after their initial treatments.

Six out of the 10 monkeys in Groups I, II, and III survived challenge infection. Among the nonsurvivors were the two animals challenged with $44 \times 10^3$ infective cells. The time of challenge did not appear critical for survival. Animals challenged up to six months and up to over one year survived. Survival of one of the animals in Group I indicates that the partially purified vaccine fraction is compatible with Freund's adjuvant and that additional injections of vaccine alone are not necessary.

TABLE II

Survival of Vaccinated Rhesus Monkeys Following *Plasmodium knowlesi* Challenge Infection

| Group* | Survivors/Total |
|---|---|
| I | 1/2 |
| II | 1/2 |
| III | 4/6 |
| BCG | 1/1 |
| TOTAL | 7/11 |

*Groups I, II and III treated with *P. Knowlesi* vaccine in conjunction with Freund's adjuvants. Group BCG treated with *P. knowlesi* vaccine in conjunction with BCG as adjuvant.

Infection in the animals challenged within 6 months and surviving with characterized by either no parasitemia or short-lived predominately trace parasitemias with an occasional peak parasitemia ranging from 1% to 4% (Table III). The red blood cell losses tended to follow the parasitemia levels and ranged from no significant losses in the no or trace parasitemia animals to a brief loss of about 50% of normal in animals reaching the 1% to 4% parasitemias. The monkey challenged after one year eventually recovered following severe infection.

TABLE III

Percent Parasitized Erythrocytes in Individual Vaccinated Rhesus Monkeys Which Survived *Plasmodium knowlesi* Challenge Infection. Percent Parasitemia Equal to Zero or Less Than The Amounts Listed Below.

| Day, post challenge | Animal* 1** | 2** | 3 | 4 | 5 |
|---|---|---|---|---|---|
| 6 | 0 | 0 | 0 | 0 | $10^{-2}$ |
| 7 | 0 | $10^{-4}$ | 0 | 0 | $10^{-1}$ |
| 8 | 0 | $10^{-4}$ | $10^{-4}$ | 0 | 4.4 |
| 9 | 0 | $10^{-3}$ | $10^{-4}$ | 0 | $10^{-0}$ |
| 10 | 0 | $10^{-3}$ | $10^{-3}$ | 0 | 2.0 |
| 11 | 0 | $10^{-3}$ | $10^{-2}$ | 0 | 1.3 |
| 12 | 0 | $10^{-3}$ | $10^{-2}$ | $10^{-3}$ | $10^{-0}$ |
| 13 | 0 | $10^{-2}$ | $10^{-3}$ | $10^{-2}$ | 2.6 |
| 14 | 0 | $10^{-4}$ | $10^{-2}$ | $10^{-2}$ | $10^{-1}$ |
| 15 | 0 | | | $10^{-2}$ | $10^{-1}$ |
| 16 | 0 | | | $10^{0}$ | |
| 17 | 0 | 0 | 0 | 1.2 | |
| 18 | 0 | 0 | 0 | $10^{-2}$ | |
| 21 | 0 | 0 | 0 | $10^{-3}$ | 0 |
| 22 | 0 | 0 | 0 | 0 | 0 |
| 32 | 0 | 0 | 0 | 0 | 0 |

*Animals No. 1, 2, 3 from Group III and challenged about 1½ months after last vaccination treatment. Animals No. 4 and 5 from Groups I and II respectively and challenged at about 4 and 6 months respectively.
**Developed slight transient parasitemias on rechallenge with $10^5$ and $74 \times 10^6$ infective cells respectively 3 months after recovery.

The young monkey treated with BCG and *P. knowlesi* vaccine fully recovered following a severe bout with the disease. The control monkey receiving BCG alone died with fulminant disease within 5 days of patent parasitemia (see Table IV).

There were no recoveries among the untreated control monkeys or among a group of monkeys treated with either vaccine alone or vaccine in combination with alum or alginate adjuvants. Challenge infection in these animals was characteristically fulminant and fatal within 5 to 7 days of patent parasitemia.

In contrast to the many months of chronic transmissible infection in drug suppressed *P. knowlesi*, recovery from challenge infection in the successfully vaccinated monkeys was apparently accompanied by sterilization against the *P. knowlesi* and the establishment of solid immunity against reinfection. Subinoculation of 2 ml. of blood from each of three monkeys 5 weeks after recovery into a clean susceptible monkey failed to transmit infection. Two monkeys rechallenged with $10^5$ and $74 \times 10^6$ living *P. knowlesi*, respectively, 3 months after recovery from the initial challenge, developed only slight, transient parasitemias.

TABLE IV

Erythrocyte Counts and Percent Parasitemias Following Challenge Infection of BCG-*P. knowlesi* Vaccine Treated Monkey and Monkey Treated With BCG Alone.

| | Treatment | | | |
|---|---|---|---|---|
| | BCG-*P. knowlesi* vaccine | | BCG only | |
| Days, post challenge | Parasitemia, percent | RBC (red blood cells) $\times 10^6$/mm.$^3$ | Parasitemia, percent | RBC $\times 10^6$/mm.$^3$ |
| 4 | 0 | 5.21 | 0 | 5.05 |
| 5 | (¹) | 4.96 | (¹) | 5.27 |
| 6 | 2 | 4.64 | 14 | 5.76 |
| 7 | 12 | 3.55 | 90 | 2.62 |
| 8 | 9 | 3.54 | 90 | 1.64 |
| 9 | 4 | | (²) | (²) |
| 10 | 15 | | | |
| 11 | 2 | 1.32 | | |
| 12 | 1 | | | |
| 13 | 2 | 0.99 | | |
| 14 | 1 | 1.17 | | |
| 16 | (¹) | 1.45 | | |
| 18 | (¹) | 1.50 | | |
| 25 | 0 | 3.70 | | |

¹ Trace.
² Dead.

The results described herein clearly establish the vaccine character of the partially purified *P. knowlesi* vaccine fraction in conjunction with BCG as adjuvant in malaria vaccination. The latter finding takes on special significance since BCG, though a powerful RES (reticuloendothelial system) stimulant, is acceptable for human use while FCA (Freund's complete adjuvant) is not suitable for use in humans.

It is claimed:

1. A process for the vaccination of an animal against malaria which comprises administering to an animal materials consisting essentially of a non-living malaria vaccine and an amount of living BCG effective to function as an adjuvant for said vaccine, the combination of malaria vaccine and BCG being sufficient to provide an immune protection of the animal against malaria.

2. The process of claim 1 wherein the malaria vaccine is *Plasmodium knowlesi*.

3. The process of claim 1 wherein the amount of malaria vaccine employed is equivalent to that required to provide an optical density value of 3 to 5 at a wavelength of 2800 angstroms in the composition to be administered.

4. The process of claim 1 wherein the BCG employed is a freeze dried preparation containing $10^8$ viable organisms per ml.

5. The process of claim 1 wherein the BCG is administered parenterally.

6. The process of claim 5 wherein the administration is to human beings.

7. The process of claim 5 wherein the malaria vaccine and the BCG are injected together into the animal.

8. The process of claim 1 wherein the BCG is administered orally.

9. The process of claim 8 wherein the administration is to human beings.

10. The process of claim 8 wherein the malaria vaccine is injected subcutaneously.

11. The process of claim 8 wherein the malaria vaccine is injected intramuscularly.

12. A composition for the vaccination of an animal against malaria consisting essentially of a non-living malaria vaccine and an amount of BCG effective to function as an adjuvant for said vaccine, the combination of malaria vaccine and BCG in the composition being sufficient to provide an immune protection of the animal against malaria.

13. The composition of claim 12 wherein the malaria vaccine is *Plasmodium knowlesi*.

14. The composition of claim 12 wherein the amount of malaria vaccine employed is equivalent to that required to provide an optical density value of 3 to 5 at a wavelength of 2800 angstroms in the composition to be administered.

15. The composition of claim 12 wherein the BCG employed is a freeze dried preparation containing $10^8$ viable organisms per ml.

References Cited

Freund et al., Science, vol. 102, pp. 200–204, 1945.

RICHARD L. HUFF, Primary Examiner